Nov. 17, 1970     E. ALCOSSER ET AL     3,540,135

EDUCATIONAL TRAINING AIDS

Filed Oct. 11, 1968     2 Sheets-Sheet 1

INVENTORS
EDWARD ALCOSSER &
JAMES P. PHILLIPS

BY

ATTORNEY

Nov. 17, 1970   E. ALCOSSER ET AL   3,540,135
EDUCATIONAL TRAINING AIDS
Filed Oct. 11, 1968   2 Sheets-Sheet 2
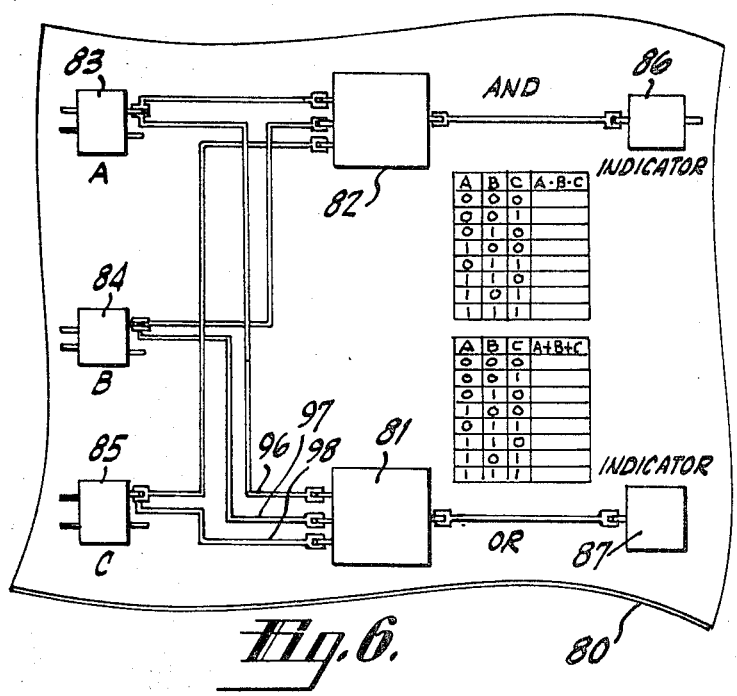
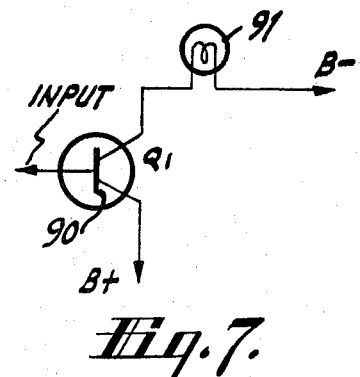
Fig. 7.
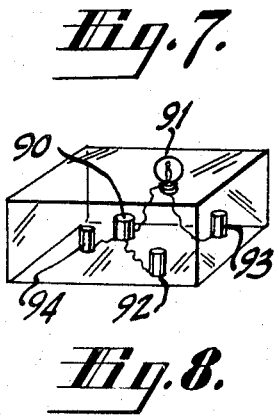
Fig. 8.
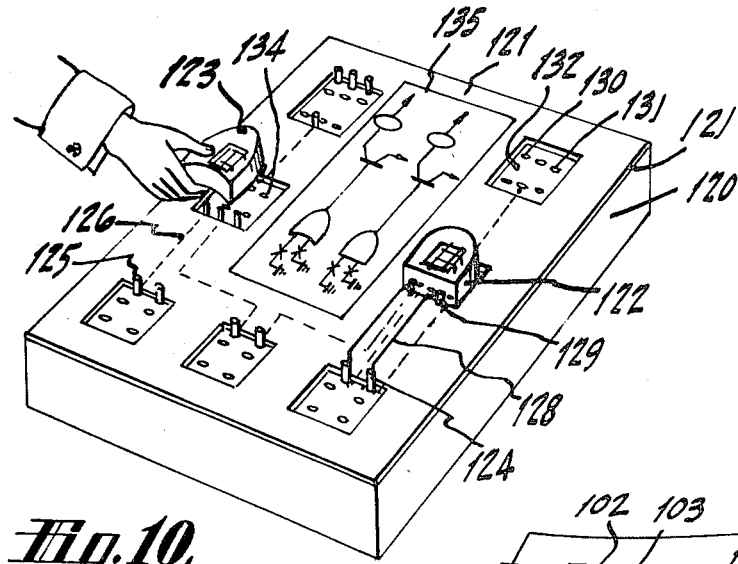
Fig. 10.
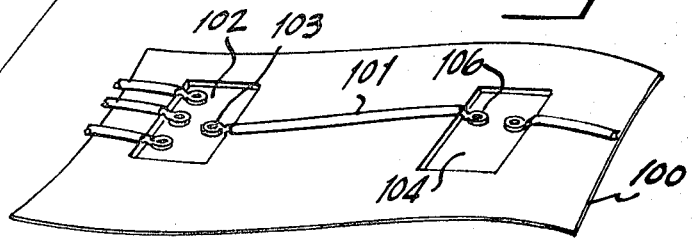
INVENTORS
EDWARD ALCOSSER &
JAMES P. PHILLIPS
BY
ATTORNEY

United States Patent Office 3,540,135
Patented Nov. 17, 1970

3,540,135
EDUCATIONAL TRAINING AIDS
Edward Alcosser, 19 Brand Drive, Huntington, N.Y. 11743, and James P. Phillips, 7 Emily Court, Greenlawn, N.Y. 11740
Filed Oct. 11, 1968, Ser. No. 766,917
Int. Cl. G09b 23/18, 23/02
U.S. Cl. 35—19                                      10 Claims

ABSTRACT OF THE DISCLOSURE

There is disclosed a training aid for educational purposes to teach elementary or secondary school students the fundamentals of Boolean algebra. A circuit board has a plurality of terminal locations thereon, each location is prewired to receive different biasing voltages necessary to operate different Boolean logic modules as diode "AND" or "OR" gates. A Boolean relation is defined by a circuit sheet congruent with the circuit board. When the sheet is placed in congruency with the board, holes in the sheet surround certain ones of the terminal locations. The student then plugs in or inserts, clear encapsulated logic modules into the locations according to instructions with said circuit sheet. The student can then view the components associated with said modules while observing connections, and so on, pertinent to the experiment. The circuit sheet further indicates wiring instructions or contains certain prewired paths according to the experiment to be performed.

---

This invention relates to educational electronic aids and more particularly to an improved assembly for use as both an educational and a visual aid in teaching logic circuit operation.

During the past few decades the field of electronics has been playing an increasingly important role in our everyday society. Banking, medicine, accounting, inventory control and so on are just a few of the fields in which the digital computer has been utilized to aid in compiling and interpretating data.

This rapid growth pattern has made electronics an important part of our every day life. With the increasing growth rate of this field, especially concerning the digital aspects, it is becoming more important to introduce a greater part of our society to an understanding of basic fundamentals of digital logic. Hence certain advanced educational groups have been instrumental in campaigning for course programs on the elementary school level concerning the operation and application of logic circuits as utilized in digital computers. Any such program involves the teaching of Boolean algebra together with how a digital circuit functions and operates within the mathematical structure of the Boolean system.

Primarily many of the existing bread-board or electronic kit assemblies have been directed to either the practicing engineers, to aid in laboratory experiment, to engineering students for course matter, or to one in a more advanced age or educational level. Consequently, there are a wide variety of such kits available, especially now when engineering time is so valuable and the shortage of engineers threatens the future expansion of the electronics industry. For an excellent survey of such present day breadboarding kits see the article entitled "Special Report on Breadboarding Kits" by Jerome Alderham in Electronic Products (United Technical Publications, Inc.) March 1967, pages 54 to 61.

While such kits are many and diversified in application and function, they are not suited to the requirements of a secondary or elementary school student or to one of this particular educational background. In essence such qualifications dictate the need for a "fool-proof" assembly or kit, free from shock hazard, easy to assemble and operate, not critical as to improper insertion of modules; while further providing large and sturdy modules and components to facilitate handling by children or inexperienced operators. For optimum educational benefits the kit or assembly should provide visual information so the student or operator can see and visualize how the experimental circuit operates and what electronic components look like physically, while further observing circuit connections.

It is therefore the primary object of the present invention to provide an improved educational electronic experimental kit.

A further object is to provide an improved educational electronic kit for use in teaching elementary school students or those of similar background fundamentals of digital logic.

These and other objects of the present invention are accomplished in an embodiment employing a circuit board fabricated from metal or a suitable plastic and having a plurality of module accomodating terminals or plug assemblies located thereon. The plug assemblies are adapted to accommodate individual logic circuits which may, for example be, "OR" and "AND" gates utilizing diode devices to perform logic. The diodes and associated components are oriented in a specific manner within the module, such orientation being related to the direction of current flow with respect to the circuit board and the accomodating plug assemblies, to further facilitate an understanding of digital circuit operation. To further provide visual experience the individual diode circuit assemblies are oriented as above and held together by a clear plastic encapsulent thereby forming a module. Hence the encapsulated module allows the experimentor to perceive the components as they actually exist, observe connections, while further allowing easy handling of the module without fear of damage to the same. Terminals for the application of suitable operating potentials are provided prior to encapsulation and appear on the surface of the module which coacts with the circuit board. The circuit board is prewired in a manner such that each accommodating plug or terminal area has a positive and negative battery terminal associated therewith for the application of a suitable potential to a module inserted or placed within a plug location. The individual modules are further constructed and oriented before encapsulation, such that the improper insertion of a module into a wrong assembly terminal location can not damage the module, the circuit board or the operator. Further provided is a circuit sheet which is placed congruently upon the circuit board before module insertion, and contains information such as schematic diagrams, or other items drafted thereupon to show exact placement of the various module assemblies, and further contains both wiring instructions and logic symbol format as utilized by electronic computer designers to aid in teaching circuit function. Due to the clear modular encapsulation of the circuit the student can "see" the diagram and the appropriate circuit connections and layout, when the modules are finally inserted corresponding to the format envisioned by the selected circuit sheet. Wires are provided with terminals on suitable ends thereof for quick connection and disconnection to other terminals associated with other modules.

Circuit sheets may also be included on which are prewired or deposited conducting paths which further have adapting land areas thereupon to provide connection between the circuit board and the modules with simultaneous automatic circuit routing upon the insertion of the module as determined by the prewired paths.

3

For a clearer understanding of the invention reference should be had to the following detailed description taken in connection with the accompanying drawings in which:

FIG. 6 is a plan view of one embodiment of a circuit sheet for use with this invention containing circuit wiring and format information.

FIG. 7 is a schematic diagram of an indicator circuit used with this invention.

FIG. 8 is a plan view of the encapsulated module according to FIG. 7.

FIG. 9 is a partial view of a prewired circuit sheet according to an embodiment of this invention.

FIG. 10 shows a plan view of an experimental set-up according to the principles of this invention.

Figure 1A:
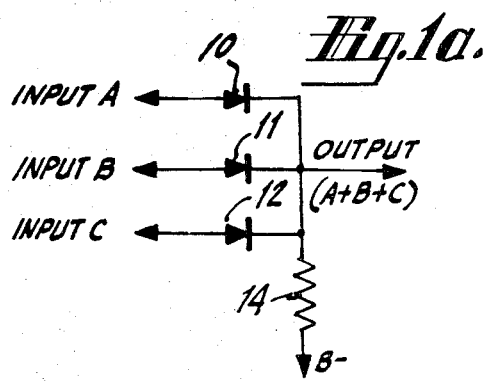
FIG. 1A is a schematic circuit diagram of a diode "OR" gate used in this invention.

If reference is made to FIG. 1A there is shown a diode "OR" gate. The circuit comprises a plurality of diodes, in this case three, the diodes 10, 11 and 12 having the respective cathodes connected to a terminal of a resistor 14, which is also designated as the output terminal. The other terminal of resistor 14 is coupled to a source o potential designated as B— which may be of a negative polarity with respect to a source of reference potential such as ground. The anode of each diode 10 to 12, is used as an input terminal for application thereto of a separate input signal. The respective anode inputs of diodes 10 to 12 have been designated as input A, input B and input C. According to the laws of Boolean algebra the circuit performs according to the following truth table.

TABLE 1.—"OR" GATE TRUTH TABLE

| Input | | | |
|---|---|---|---|
| A | B | C | Output=A+B+C |
| 0 | 0 | 0 | 0 |
| 1 | 0 | 0 | 1 |
| 0 | 1 | 0 | 1 |
| 1 | 1 | 0 | 1 |
| 0 | 0 | 1 | 1 |
| 1 | 0 | 1 | 1 |
| 0 | 1 | 1 | 1 |
| 1 | 1 | 1 | 1 |

According to the above Table if any of the inptus at the anodes of diodes 10 to 12 are logical "one" the output is logical "one." For example, assume logical "one" is represented by a positive potential with respect to B— which may be ground and logical zero is represented by a negative potential or B—. Further assume that the potential on the anode of diode 10 or input A, is at logical one and positive and the potentials at inputs B and C are negative. In this manner diode 10 is conducting and

4 the potential on the anode causes the cathode to appear at logical one due to the current flowing through resistor 14 from the B— supply through diode 10. If any other diode 11 or 12, or all diodes have an associated input at logical one the output is still at logical one. However, if inputs A to C are at logical zero the output is at logical zero as well. This is so as all diodes are reversed biased and thus there is not current path through resistor 14, which causes the output to remain at B— or logical zero. the above "OR" gate is well known and examples of the same can be found in any text on logical circuitry. See for example, the text entitled "General Electric Transistor Manual" (5th edition), (1960) pages 134 to 135.

Figure 1B:
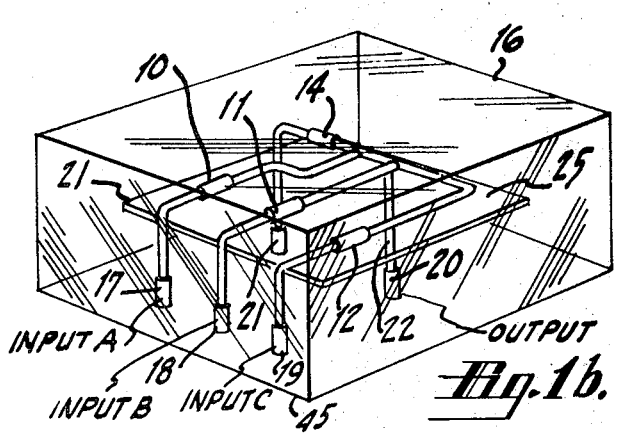
FIG. 1B is an actual replica isometric drawing, not to scale, of a clear plastic encapsulated module incorporating the actual physical components necessary according to FIG. 1A.

If reference is made to FIG. 1B there is shown an encapsulated module containing the components specified in the description of FIG. 1A and similar numerals have been retained where applicable.

Semiconductor diodes as germanium or silicon devices are mounted on a component board 25, which may be fabricated from a clear plastic material as lucite or from an opaque material as bakelite or other suitable plastic. The diodes 10 to 12 are mounted and wired on the board 25, as indicated in the schematic shown in FIG. 1A. The units may be glued, pasted or otherwise suitably fastened to the board 25 prior to encapsulation. The anode of the diodes 10 to 12 are terminated at the end of their respective leads by a suitable terminal plugs designated as 17, 18 and 19 and furthere referenced, as in FIG. 1A, as input A, input B and input C. The output, which is at the junction of the cathode electrodes of diodes 10 to 12 and a terminal of resistor 14, is brought by means of a lead or wire 22 to the same plane as that containing terminals 17 to 19, and terminated by means of a similar terminal plug 20.

Resistor 14 has its other terminal connected to a further terminal plug 21 for application of (B—) or a negative potential to the diode and resistor assembly comprising the "OR" gate.

As is seen from FIG. 1B when the circuit is wired and the terminals 17, 18, 19, 20 and 21 added, the unit will be supported by the "leg-like" structures formed by the terminal plugs and associated wires. The entire circuit assembly is placed in a suitable mold and encapsulated by means of a transparent type plastic or epoxy resin. Suitable examples of such potting compounds are known by registered trade names as Dow Corning's Sylgard #182, 184 or Emerson and Cuming's Stycast 1266. There are other brand and trade names, and so on of suitable encapsulants which permit visual inspection of components encapsulated therein while protecting the-package from shock, temperature and in general mechanical vibration. Such materials referred to are generally designated as epoxy or urethane resins.

The final packaged module is therefore surrounded by the epoxy encapsulant 25 which allows one to see the actual components as utilized. Therefore one can physically view diodes as compared to resistors or other components included within the encapsulant 25 and learn to distinguish therebetween visually. The FIG. 1B shows a solid rectangular module, but other shapes as dictated by a suitable mold fabricated to a different geometric configuration and large enough to hold the circuit assembly, prior to the addition of the encapsulant may be afforded.

Figure 2A:
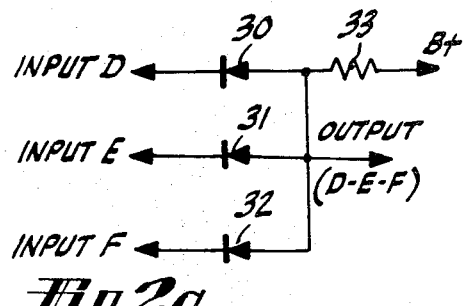
FIG. 2A is a schematic circuit diagram of a diode "AND" gate used in this invention.

FIG. 2A shows a typical circuit schematic of a diode "AND" gate. The diodes are labelled 30 to 32 respectively. The anodes of the diodes 30 to 32 are connected to a terminal of a resistor 33, whose other terminal is connected to a source of potential, positive with respect to a reference potential and further designated as B+. The cathode electrodes of diodes 30 to 32 form separate inputs to the "AND" gate and are further designated as input D, input E and input F respectively. The Truth Table for a diode "AND" gate is shown below and is well known and documented in the prior art. For a suitable example see the above cited text.

TABLE 2.—"AND" GATE TRUTH TABLE

| Input | | | |
|---|---|---|---|
| D | E | G | Output=D.E.F |
| 0 | 0 | 0 | 0 |
| 1 | 0 | 0 | 0 |
| 0 | 1 | 0 | 0 |
| 1 | 1 | 0 | 0 |
| 0 | 0 | 1 | 0 |
| 1 | 0 | 1 | 0 |
| 0 | 1 | 1 | 0 |
| 1 | 1 | 1 | 1 |

Figure 2B:
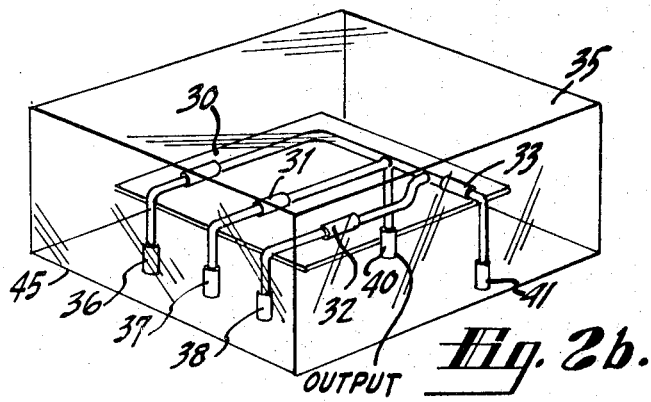
FIG. 2B is a plan view drawing, not to scale, of a clear plastic encapsulated module incorporating the components according to FIG. 2A.

If reference is made to FIG. 2B the encapsulated "AND" gate of FIG. 2A shows the same number of components (i.e., the three diodes 30 to 32 and resistor 33) connected to suitable terminal plugs and encapsulated in a clear epoxy casing as 35. Inputs D to F correspond respectively to terminal plugs 36 to 38. The output terminal plug is referenced as 40. The other terminal of resistor 33 is connected to a terminal plug 41 to which B+ may be applied. If one compares the physical module of FIG. 1B with that of 2B, it is apparent that the physical characteristics of the two are very similar. The student upon close observation will note the diode reversal. It is also noted that the resistors 14 and 33 extend in a different direction for the assemblies as shown. In FIG. 1B resistor 14 is directed towards terminal 11 towards the left of output terminal 20, while for the orientation shown resistor 33 of FIG. 2B is directed to the right of output terminal 40. This placement of the output or biasing resistors 14 and 33 for the "OR" and "AND" gates is provided intentionally to always permit the proper biasing levels as B— or B+ to be applied to the "OR" and "AND" gate for a suitable location in the circuit board.

It is also noted that the output terminals, as 20 and 40, are located approximately in the center of the bottom surface 45 towards the right side of the rectangular solid structure, as shown, in FIGS. 1B and 2B, of the "OR" and "AND" gates; while the input terminals are located left from the center at the bottom surface of the module.

Figure 3A:
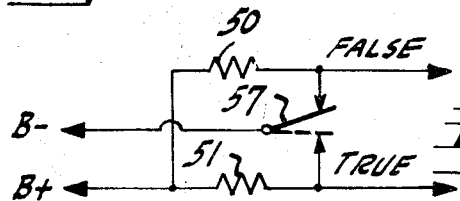
FIG. 3A is a schematic circuit diagram of a switch assembly used in this invention.
Figure 3B:
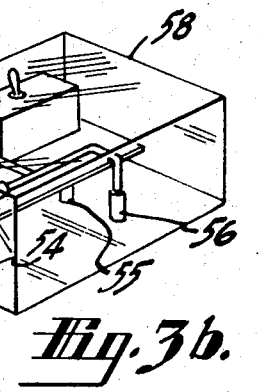
FIG. 3B is an actual replica isometric drawing, not to scale, of the encapsulated physical switch module shown in FIG. 3A.

If reference is made to FIGS. 3A and 3B there is shown an encapsulated switch module in FIG. 3B and its associated schematic including biasing resistors 50 and 51 in FIG. 3A.

When the switch contact arm 57 is in the position shown, the output indicated false, which corresponds to binary or Boolean logic level zero, is at B— and the output indicated true, which corresponds to binary or Boolean logic level one is at B+. When the switch is placed in the dashed line position, the output labelled true is at B— (logic zero) and the output labelled false is at B+ due to the selection of resistors 50 and 51.

FIG. 3B shows the switch as a physical component after encapsulation in a clear epoxy resin 58, forming a rectangular solid. As before, B— and the B+ level inputs terminate in terminal sockets or plugs 55 and 56 on the bottom surface of the module, and the true and false outputs corresponding to binary "1" and "0" or Boolean logic levels "1" and "0" appear at the terminals 53 and 54.

Figure 4:
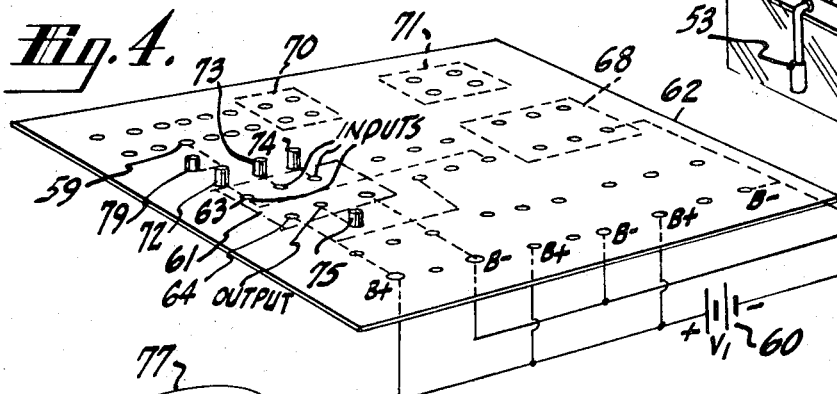
FIG. 4 is a schematic diagram, partially in plan view and circuit diagram showing a circuit board incorporating plug assemblies according to this invention.

If reference is made to FIG. 4 there is shown a circuit board 62, which may be fabricated from aluminum, sheet metal or a bakelite type material. The circuit board has a plurality of holes located thereon arranged in predetermined groups, each hole is accommodated with a suitable connector or terminal plug or socket as 63 which is the male or female counterpart to a terminal as 40 shown in FIG. 2B associated with the logic module "AND" gate.

A typical group of terminals as appearing on circuit board 62 is shown enclosed within dashed rectangle 61. A terminal in each group, as 65, is prewired to a source of negative potential as the negative terminal of battery 60. In a similar manner all terminals as 64 in each group is wired to the positive terminal of the battery 60 and hence are designated as B+. It is, of course, understood that two batterys may be used, one as a negative (B— supply) and the other as a positive or B+ supply. In this manner the various groups (see also those terminals enclosed by rectangle 68) have a B+ and a B— terminal. A terminal labelled output is also available in each group between the B+ and B— terminals. There are also shown three terminals labelled inputs which are necessarily included in each group of terminal locations as 61 and 68.

As can be seen from FIG. 4 if a module as that shown in FIG. 2B is properly inserted within the rectangle 61, the terminals plugs of the module will coact with the terminal sockets or plugs of the circuit board 62 in the following manner.

Terminal 41 of FIG. 2B will coact with terminal 64 of group 61 on circuit board 62 and cause B+ to be applied to the appropriate terminal of resistor 33. Terminals 26, 27 and 28 of FIG. 2B will coact with those labelled "inputs" of group 61. In the above manner proper insertion of the module of FIG. 2B into the group of terminals 61 will bias the module automatically as required for an "AND" gate function (see FIG. 2A).

If one inserted the module of FIG. 1B into the same group of terminals 61 on board 62, terminals 17 to 18 or inputs A to B will coact with terminals labelled "inputs" on board 62. Terminal 20 coacts with the terminal labelled "output" on board 62, while the B— supply is applied to terminal 21 via terminal 65 of group 61, thus automatically biasing the module of FIG. 1A properly to perform or operate as an "OR" gate. It is noted that the switch module shown in FIG. 3B can also be inserted in such a group as 61 and will be biased properly as terminals 55 and 56 will be inserted into terminals 64 and 65 on board 62, while the true and false output terminals 53 and 54 will be inserted into two adjacent input terminals in this case. In any event special groupings as 70 and 71 may be included on board 62 for accommodation of switch modules as shown in FIG. 3B.

Figure 5:
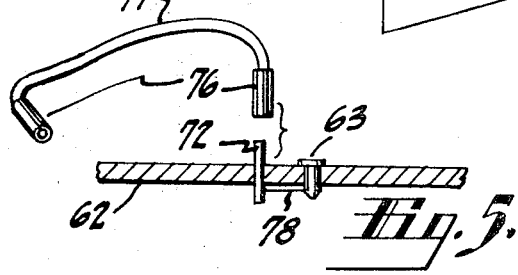
FIG. 5 is a partial cross sectional view of the circuit board of FIG. 4 showing a terminal post adapted to receive a wire with a suitable connector according to an embodiment of this invention.

Also shown in FIG. 4 are terminals 72, 73, 74 and 75. Each terminal may be a conductive post or male socket pin and is prewired on the circuit board 62 to a terminal corresponding to each input and output terminal on board 62. Such posts as 72 to 75 are adapted to receive a socket type terminal which would be soldered or fastened to one end of a wire to allow interconnections. A suitable arrangement is shown in FIG. 5. Terminal post 72 is connected by means of a wire or bus 78 to the terminal plug or socket 63. A wire 77 has a female adaptor 76 on both ends. The adaptors 76 are dimensioned, as known, to fit over and make electrical contact with terminal post 72 and therefore the circuit component or device of a suitable module plugged into terminal plug or socket 63 of circuit board 62. In this manner wire 77 can, for example connect terminal post 72 to a similar post as 79, shown in FIG. 4 connected to a socket 59, which is part of a different group of terminals on board 62.

FIG. 6 shows a prepared circuit sheet 80. Sheet 80 may be fabricated from a bond paper, cardboard, plastic and so on. Numerals 81 and 82 reference module accommodating holes which are positioned upon the sheet in predetermined locations to correspond with a terminal group as 61 or 68 on the circuit board 62 of FIG. 4. In a similar manner numerals 83 to 85 reference switch module acommodating holes which correspond to switch terminal groups as 70 and 71 on circuit board 62 of FIG. 4. These suitably located holes as 86 and 87 are positioned on circuit sheet 80 to accommodate indicator circuit modules. Such modules may be transistor circuits coupled with indicator lamp assemblies.

An example of a suitable indicator circuit is shown in FIG. 7. A PNP transistor 90 has a collector electrode coupled to a terminal of a suitable indicator lamp 91 whose other terminal is coupled to B—. The emitter electrode of transistor 90 is coupled to B+ while the base electrode is used as an input terminal.

FIG. 8 shows the indicator circuit encapsulated in a clear epoxy with the same numerals used to designate the transistor 90 and lamp indicator 91. As before there is a terminal 92 and 93 for B+ and B− respectively to which the emitter and collector electrode are coupled. The input terminal 94 is coupled to the base electrode of transistor 90.

Referring back to FIG. 6 it is seen that the circuit sheet contains wiring path indicators thereon to indicate to the operator where wires as 77 of FIG. 5 are to be placed in order to perform the experiment associated with a particular circuit sheet as 80. In this manner holes 83, 84 and 85 receive a switch module while holes 81 and 82 receive an "OR" gate and "AND" gate module respectively. Holes 86 and 87 will receive indicator circuits, and the wiring format to be implemented is shown between these suitably positioned module accommodating openings by printed or deposited circuit wiring data as shown by runners 96, 97 and 98.

Printed information as truth tables for "OR" and "AND" gates may be included upon the sheet to make available to the student or operator the Boolean relationships involved in the particular experiment. Such matter also serves to indicate the proper surface of the circuit sheet 80 which is to be positioned upwards with respect to placement upon the congruent circuit board as 62 of FIG. 4.

Referring to FIG. 9 there is a shown another embodiment of a portion of circuit sheet 100, on which conductors as 101 fabricated from copper are printed or deposited upon circuit sheet 100. Other conducting material to form a circuit pattern as shown in FIG. 6, which requires no wiring at all by the student or operator can be utilized in lieu of copper.

In FIG. 9 a module accommodating hole 102 is properly positioned on the circuit sheet as described for FIG. 6. The predeposited conductor 101, which may be ordinary wire positioned or glued to the surface of sheet 100 has a module accommodating land terminal 103 on one end which is located within the hole 102 and which will coact with a terminal socket as an output terminal on circuit board 62 of FIG. 3 and a module terminal as terminal 20 of FIG. 1B. A pasted or deposited conductor 101 is routed to another module accommodating hole as 104 and is again terminated in a module accommodating land terminal as 106, which will coact both with a circuit board socket and a module terminal as described for 103.

In the above manner when a student inserts a module as determined by placing a circuit sheet in congruency with a circuit board, contact is made by means of the land area as 103 and 106 and wiring is avoided, as the prewired conductors 101, furnish the correct paths as would the addition of external wires. The glued, pasted or deposited conductors as 101, may be ordinary wire, with insulation and therefore one can cross the same without fear of short circuits on the sheet 100. If exposed copper deposited leads are used suitable insulation areas can accommodate cross over of such conductors. Such techniques for accomplishing the same, including laminated circuit sheets and so on are known in the art.

FIG. 10 shows a congruent circuit sheet 121 placed upon a circuit board 120 in proper position. The acommodating holes as 132, prepositioned on the circuit sheet surround a terminal area of circuit board 120 to expose the terminal sockets as 130 and 131 to the operator. The circuit which serves to indicate to the student or operator the upward or correct exposed surface of the circuit sheet 121.

In FIG. 10 the terminal posts as 124, 125 are likewise surrounded by the module accommodating holes in circuit sheet 121 and are in line with the printed indications of the wire routes. Also shown is an "AND" module 122, encapsulated in clear epoxy and dimensioned to assume a three dimensional "AND" gate logic circuit symbol, for the conveyance of further information to the student and further aiding in avoiding confusion between module types. The module 122 is inserted in the appropriate accommodating hole by the student as determined from printed or included schematic matter on the circuit sheet 121 or by means of an instruction book or sheet included with the training aid. Such matter may be a circuit schematic as shown enclosed within rectangle 135, on circuit sheet 121. When module 122 is thusly placed, the student can see the connections between the the board 120 and the module 122, which further allow him to easily comprehend current flow, polarity of voltage as determined by noting which terminal of the module coacts with the B+ or B− board terminal. Also shown is a wire 128 which is placed by a student between the terminal post 129 or circuit board 120 corresponding to an input of the "AND" gate module 122, and a terminal post 124, which may be a true or false output associated with a switch module (FIG. 3). Accommodating holes as shown on the circuit sheet of FIG. 6 can be made either of uniform size for the logical "AND" and "OR" gate modules, and a different size selected for switch and indicator modules.

FIG. 10 shows a student or operator about to insert an "OR" gate module 123 into the accommodating hole 134.

As can be seen from FIG. 10, the kit assembly as described allows the student to view connections between modules 122 and 123 circuit board 120, and the circuit sheet. Wiring format is either prewired to the circuit sheet or adequately described thereon, to allow young and inexperienced operators to perform experiments with a minimum of supervision which experiments involve concepts of Boolean algebra.

The clear encapsulation of the modules allows the operators to visualize circuit components in their true physical appearance and to relate the same with circuit operation and layout, while further preventing damage to the modules by mishandling and so on.

What is claimed is:

1. An educational electronic teaching aid for use in instructing students or operators of an elementary school background in the concepts of Boolean algebra, comprising:
   (a) a circuit board having a plurality of terminal sockets located on a given surface thereof each of said plurality of terminal sockets adapted to receive a terminal plug,
   (b) first mean coupled to certain first ones of said plurality of terminal sockets for applying a positive potential thereto,
   (c) second means coupled to certain second different one of said plurality of terminal sockets for applying a negative potential with respect to said positive potential thereto,
   (d) a circuit sheet having a surface of substantially the same dimensions as said given surface of said circuit board, and further having a plurality of openings on said surface thereof, each of said openings positioned on said circuit sheet to surround certain preselected groups of said terminal sockets when said sheet is congruently placed on said circuit board surface, each of said openings surrounding at least one of said first ones of said terminals and one of said certain second ones of said terminals, whereby when said circuit sheet is placed on said circuit board only a preselected portion of said terminal sockets appear within said openings,
   (e) at least one module including a plurality of logic performing devices connected therein to operate when a proper potential is applied according to a specified Boolean relationship, and encapsulated in a clear, transparent plastic like substance, said module having a plurality of terminal plugs adapted to coact with said terminal sockets appearing in at least one of said openings, whereby insertion of said module in said at least one opening causes a potential to be applied thereto according to said Boolean relationship of said logic module, while said transparent nature of said encapsulated module permits the operator or student to view the circuit components therein.

2. The educational electronic teaching apparatus according to claim 1 wherein:
said circuit sheet has deposited thereon a series of instructions specifying said Boolean relationship in terms of an equation, with a suitable space on said sheet to permit said operator to write observations thereon pertinent to said instructions.

3. The educational electronic teaching apparatus according to claim 2 wherein:
said logic module includes a plurality of diode devices having their cathodes connected together,
a resistor connected between the cathodes and a selected one of said terminal plugs, to cause said connections to define a circuit for implementing a Boolean OR function,
said selected terminal plug coacting with said second certain ones of said terminal sockets coupled to said second means for applying a negative potential with respect to said positive potential, when said module is inserted in said opening.

4. The educational electronic teaching apparatus according to claim 2 wherein:
said logic module includes a plurality of diode devices having their anodes connected together,
a resistor connected between said anodes and a certain other selected one of said terminal plugs, to cause said connection to define a circuit for implementing a Boolean AND function,
said certain other selected one of said terminal plugs coacting with said first ones of said terminal sockets coupled to said first means for applying a positive potential thereto when said module is inserted in said opening.

5. An educational electronic teaching aid for use in instructing students or operators of an elementary or secondary school background in relationships of Boolean algebra, comprising:
(a) a circuit board having a plurality of terminal sockets located on a given surface thereof, said plurality of terminal sockets adapted to receive a terminal plug,
(b) a first selected group of said terminal sockets adapted to receive a positive potential biasing means,
(c) a second different selected group of said terminal sockets adapted to receive a biasing means of a negative polarity with respect to said positive potential,
(d) a circuit sheet having a surface of substantially the same dimensions as said given surface of said circuit board, said circuit sheet having on a surface thereof instructions printed thereupon defining a given Boolean equation, said circuit sheet further having openings on said surface positioned on said circuit sheet to surround certain preselected groups of said terminal sockets when said sheet is placed on said circuit board with said printed instructions facing upwards, each of said openings encompassing one terminal of said first group of terminal sockets and one terminal of said second group of terminal sockets and said openings further dimensioned whereby when said sheet is placed upon said circuit board a predetermined number of other sockets not included in said first or second group are exposed through said opening together with said one terminal of said first and second groups,
(e) a module encapsulated in a clear plastic, including a number of logic performing devices connected together to form a circuit capable of solving said Boolean function, said module having a plurality of terminal plugs which correspond to said predetermined number of other sockets, and at least one plug corresponding to one socket from said one of said groups whereby when said module is inserted into said opening said terminal plugs coact with said terminal sockets to receive a bias of a polarity according to said Boolean function to be solved, said transparent nature of said module allowing said student to visualize said logic performing devices,
(f) means coupled to said predetermined other sockets for applying thereto a Boolean logic level according to said Boolean function.

6. The apparatus according to claim 5 wherein said logic performing devices are semiconductor diodes.

7. The apparatus according to claim 6 wherein said logic module is encapsulated in a transparent epoxy resin of physical characteristics sufficient to enable said student to view said components while preventing said components from being damaged due to mishandling of said module.

8. The apparatus according to claim 6 further comprising:
(a) indicator output means coupled to one of said predetermined other sockets coacting with an output terminal plug of said module sufficient to visually indicate the output condition of said circuit module according to said Boolean logic level applied to said predetermined other sockets.

9. An educational electronic teaching aid for use in instructing students or operators of an elementary school background in the concepts of Boolean algebra, said aid employing gates for performing simple Boolean logic functions, comprising:
(a) a circuit board having a plurality of terminals located on a given surface thereof and arranged in predetermined groups over said surface, each of said predetermined groups adapted to receive one of said gates, one terminal of said group further adapted for application thereto of a positive biasing potential, and a second different terminal of each group adapted for application thereto of a potential negative with respect to said positive terminal,
(b) a circuit sheet having a surface of substantially the same dimensions as said given surface of said circuit board and further having a plurality of openings thereon positioned on said sheet to surround certain preselected groups of said terminals when said circuit sheet is congruently properly placed on said circuit board, said groups selected according to a Boolean equation to be solved as defined by said circuit sheet openings,
(c) a first plurality of semiconductor logic devices connected within a clear transparent and operative upon the insertion of a proper bias to perform a Boolean AND function said logic devices and said encapsulent forming a logic module, said module having terminals available on a surface thereof each terminal of which is coupled to a suitable electrode of said logic devices whereby when one of said modules is inserted in certain ones of said openings according to said Boolean equation said terminals are caused to coact with one of said positive potential, to cause said AND gate module to receive said proper bias, said clear encapsulent allowing an operator to view said terminals of said module which are coacting with those of said group,
(d) a second plurality of semiconductor logic devices connected within a clear encapsulent and operative upon the application of a proper bias to perform a Boolean OR function, said logic module having terminals available on a surface thereof, each terminal of which is coupled to a suitable electrode of said logic devices whereby when one of said modules is inserted in certain ones of said openings according to said Boolean equation, said module terminals are caused to coact with different ones of said predetermined groups in a manner to be energized solely by said negative potential to cause said OR gate module to receive said proper bias, said clear encapsulent allowing said operator to view said terminals of said module which are coacting with those of said different ones of said predetermined groups.

10. The apparatus according to claim 9 wherein said circuit sheet has deposited thereon a plurality of conducting members each having a module accommodating land area at an end thereof located within one of said openings to accommodate a connection between said one opening and another of said openings without the need for additional wiring members, whereby when said modules are inserted into said circuit board according to said circuit sheet instructions, connections therebetween are automatically accommodated.

References Cited

UNITED STATES PATENTS

| | | | |
|---|---|---|---|
| 3,100,943 | 8/1963 | Preston | 35—30 |
| 3,410,001 | 11/1968 | Blum | 35—19 |
| 3,416,240 | 12/1968 | Barber | 35—19 |

HARLAND S. SKOGQUIST, Primary Examiner

U.S. Cl. X.R.

35—30